July 14, 1953 — A. J. BOHMAN — 2,645,331
ENDLESS CONVEYER FOR POULTRY FEEDING APPARATUS
Filed Sept. 2, 1950
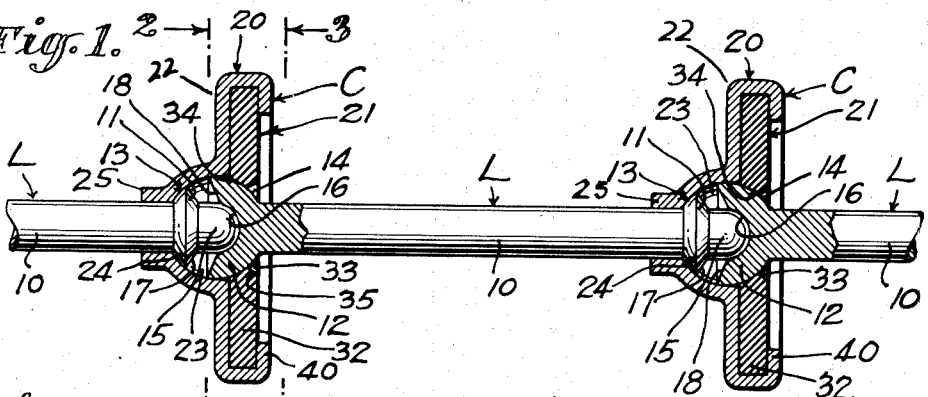
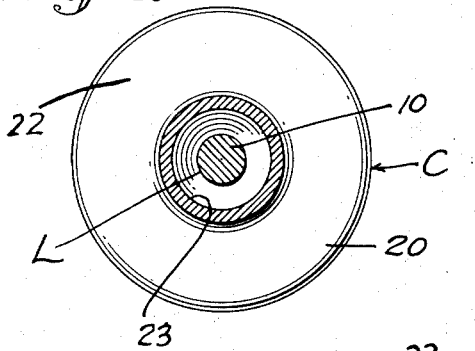
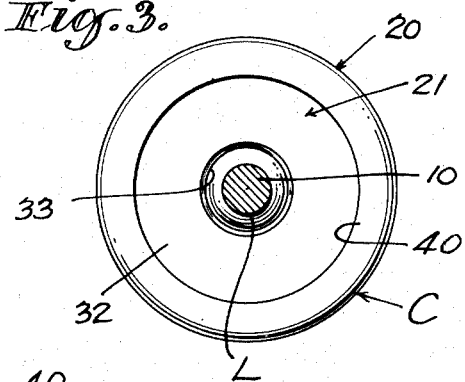
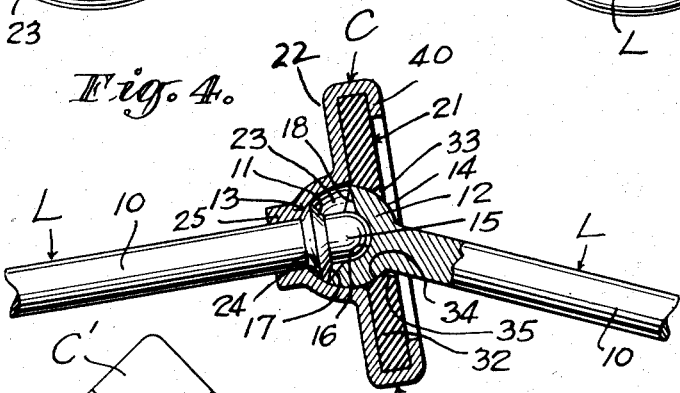
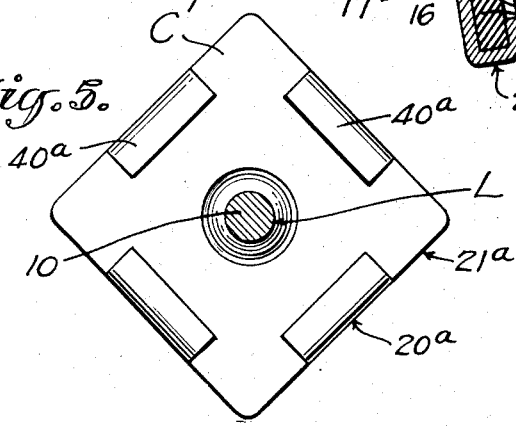
INVENTOR.
AXEL J. BOHMAN
BY
Frederick Diehl
ATTORNEY Patented July 14, 1953

2,645,331

UNITED STATES PATENT OFFICE 2,645,331

ENDLESS CONVEYER FOR POULTRY FEEDING APPARATUS

Axel J. Bohman, North Hollywood, Calif.; The Farmers and Merchants National Bank of Los Angeles, executor of said Axel J. Bohman, deceased Application September 2, 1950, Serial No. 182,930

4 Claims. (Cl. 198—176)

My invention relates generally to poultry feeding apparatus of the type embodying an endless feed conveyor in the form of a flexible cable to which feeding elements in the form of disks are secured at spaced locations for co-action with feeding troughs in a poultry house, in supplying feed from a suitable hopper to many hundreds of fowl at the same time, during driving of the conveyor at a relatively slow speed.

The primary object of my present invention is to provide an endless conveyor structurally characterized by simple means which maintains the feeding elements or disks definitely spaced apart without any possibility of them shifting their positions or in any way slipping along the length of the conveyor, as is a serious defect with conveyor belts of types heretofore proposed; and which renders the conveyor sufficiently flexible to turn corners, by dividing the conveyor into relatively short, rigid sections or links which are joined by novel connectors constituting the feeding elements or disks and forming knuckle or universal joints between the links, all so as to insure accurate and highly efficient driving of the conveyor by operative co-action of a driving mechanism with the disks.

Another object of my invention is to provide an endless conveyor which, in its use for poultry feeding, is self cleaning when run empty with the supply of feed from the hopper discontinued; which can efficiently convey small, granular feed; and which can be operated at any angle and also as an elevator without in any way detracting from its mechanical efficiency.

With these and other objects in view, my invention resides in the combinations, arrangements and functional relationships of elements as set forth in the following specification and particularly pointed out in the appended claims.

In the accompanying drawings,

Figure 1 is a view showing in central longitudinal section, a portion of an endless conveyor embodying my invention;

Figures 2 and 3 are transverse sectional views taken on the lines 2—2 and 3—3, respectively, of Figure 1;

Figure 4 is a view similar to Figure 1 and illustrating the flexibility of the conveyor enabling it to turn corners; and Figure 5 is a view similar to Figure 3, and illustrating a slightly modified form of connector embodying my invention.

Referring specifically to the drawings and particularly to Figures 1 to 4, inclusive, my invention in its illustrated embodiment is composed of a multiplicity of short, rigid members or links L constructed of round rod stock to provide shanks 10 having heads 11 and 12 upset on their ends, the heads being portions of spheres to provide on their peripheral faces annular bearing shoulders 13 and 14 in confronting relationship.

The head 11 of each link L is provided with a co-axially related centering teat or knuckle 15 of generally semi-spherical form, whereas the head 12 of each link is provided with a co-axially related socket 16 also of generally semi-spherical form adapted to receive the teat 15 of the next link to provide a universal or knuckle joint between successive links and to prevent relative lateral displacement between them. The confronting faces of the heads 11 and 12 of adjacent links are relieved by slightly beveling them as shown at 17 and 18, respectively, to enable the links to relatively move about the knuckle joint as shown in Figure 4. It will be noted from Figures 1 and 4 that the centers of the peripheral surfaces provided on the heads 11 and 12 by the annular bearing shoulders 13 and 14 coincide with the centers of the teat 15 and socket 16, respectively.

The links L are connected at their ends to form an endless conveyor, by identical feeding elements or connectors C, each of which is constructed of sheet metal in two sections 20 and 21. The female section 20 is composed of a circular plate 22 having a semi-spherical socket 23 receiving the head 11 and providing an annular shoulder 24 against which the shoulder 13 of the head 11 abuts. The socket 23 merges into a hub 25 in which the shank 10 of a link L tightly fits so as to rigidly mount the connector section 20 on the link in a position wherein the section is perpendicular to the length of the link.

The male section 21 is composed of a circular plate or disk 32 provided with a central opening 33 freely receiving the shank 10 of a link and defining an annular bearing shoulder 34 complementary to the peripheral surface formed by the bearing shoulder 14 of the head 12. The opening 33 is flared at 35 to provide clearance for a limited angular or tilting movement of the link relative to the section 21 about the center of the teat 15.

The section 20 of each connector is of sufficiently larger diameter than the section 21 to permit the peripheral portion of this section to be bent over the peripheral portion of the section 21 after the sections have been applied to the links, all to the end of providing an annular retaining flange 40 on the section 20 which coacts with the section 21 in securing the sections together as a single rigid unit. As the teat 15 of one link is now seating in the socket 16 of the next link, and as the peripheral surface of the shoulder 14 on the head 12 is free to ride against the shoulder 34, the links are connected for relative tilting movements in any direction about the center of the teat 15, and irrespective of the tensile stresses imposed on the links when a conveyor composed of the links L and connectors C is being driven under load.

The form of connector C' shown in Figure 5, which is intended for use in a V-shaped trough, is similar in construction to the previously described connector C, and differs mainly therefrom in making the two sections 20a and 21a of the connector square in outline instead of circular, and rigidly securing the sections together by separate flanges 40a along the sides of the sections rather than by the continuous flange 40.

In the use of the conveyor in poultry feeding apparatus wherein the connectors C or C' form the feeding elements to advance poultry feed in a trough as the conveyor is being driven by a suitable driving mechanism (not shown), the connectors cannot possibly shift relative to the links in a direction axially thereof, and are thus maintained at predetermined uniform distances apart so as to insure accurate and continuous movement being imparted to the conveyor through the medium of the connectors by such driving mechanism.

Furthermore, the construction of the conveyor renders it practically impossible for poultry or small animals to be injured by the conveyor, as there are no sharp edges or surfaces with which the fowl or animals can come in contact when feeding at the conveyor.

I claim:

1. An endless flexible conveyor of the class described comprising: a plurality of links composed of shanks having a semi-spherical head at one end and a centering teat at the other end; connectors for securing the links together and each composed of two sections; one section having means co-acting with said other end of the shank of a link to rigidly support such section on the link; the other section having means co-acting with said head of the next link to mount such link from said other section for angular movement relative to the latter about a center; and means rigidly securing the sections together; each link having a socket in said head thereof receiving said teat of the next link when the links are joined by the connectors, so as to provide a knuckle joint between the ends of the links at each connector, with the center of such joint coincident with the aforementioned center.

2. An endless flexible conveyor of the class described comprising: a plurality of links composed of shanks having annular shoulders at their ends, one of which is semi-spherical; connectors for securing the links together and each composed of two sections; one section having a socket in which the other annular shoulder of one link is seated, and provided with a hub tightly receiving the shank of the link to rigidly support said one section on the link; the other section having an opening bounded by an annular bearing shoulder and freely receiving the shank of the next link, with said semi-spherical annular shoulder of said next link projecting into said socket of said one section and engageable with said bearing shoulder of said opening to provide for angular movement of said next link relative to said other section about a center; and means rigidly connecting the sections of the connector together; each link having a semi-spherical centering teat projecting axially beyond the other of said annular shoulders and a socket receiving the teat of the next link when the links are joined by the connectors, so as to provide a knuckle joint between the ends of the links in each connector, with the center of such joint coincident with the aforementioned center.

3. An endless flexible conveyor of the class described comprising: a plurality of links composed of shanks having heads at their ends providing annular shoulders; connectors for securing the links together and each composed of two plates; one plate having a socket in which a head of one link is seated, and provided with a hub tightly receiving the shank of the link to rigidly support said one plate on the link; the other plate having an opening bounded by an annular bearing shoulder and freely receiving the shank of the next link, with a head of the latter projecting into said socket of said one plate and having its annular shoulder engageable with said bearing shoulder of said opening to provide for angular movement of said next link relative to said other section about a center; one of said plates having a perimetric flange co-acting with said other plate to rigidly secure the plates together; each link having a centering teat at one end and a socket at the other end receiving the teat of the next link, so as to provide a knuckle joint between the confronting ends of links, with the center of such joint coincident with the aforementioned center.

4. In an endless conveyor of the class described, an article of manufacture comprising: a link composed of a shank having heads at its ends; connector sections, one of which is rigidly supported on the link at one end thereof and is provided with a socket receiving one of said heads to co-act therewith in preventing axial displacement of the said one connector section from the respective end of the link; the other section having an opening freely receiving the shank of the link and provided with means coactable with the other of said heads in preventing axial displacement of said other section from the respective end of the link while rendering the link angularly movable relative to the other section about a predetermined center; said link having a centering teat at one end and a socket at the other end adapted to receive the teat of the next link in the conveyor, so as to provide a knuckle joint between the ends of the links, with the center of such joint coincident with said predetermined center when the links are connected.

AXEL J. BOHMAN.

References Cited in the file of this patent

UNITED STATES PATENTS

| Number | Name | Date |
|---|---|---|
| 499,525 | Dodge | June 13, 1893 |
| 1,218,631 | De Monts | Mar. 13, 1917 |